Figure 1:
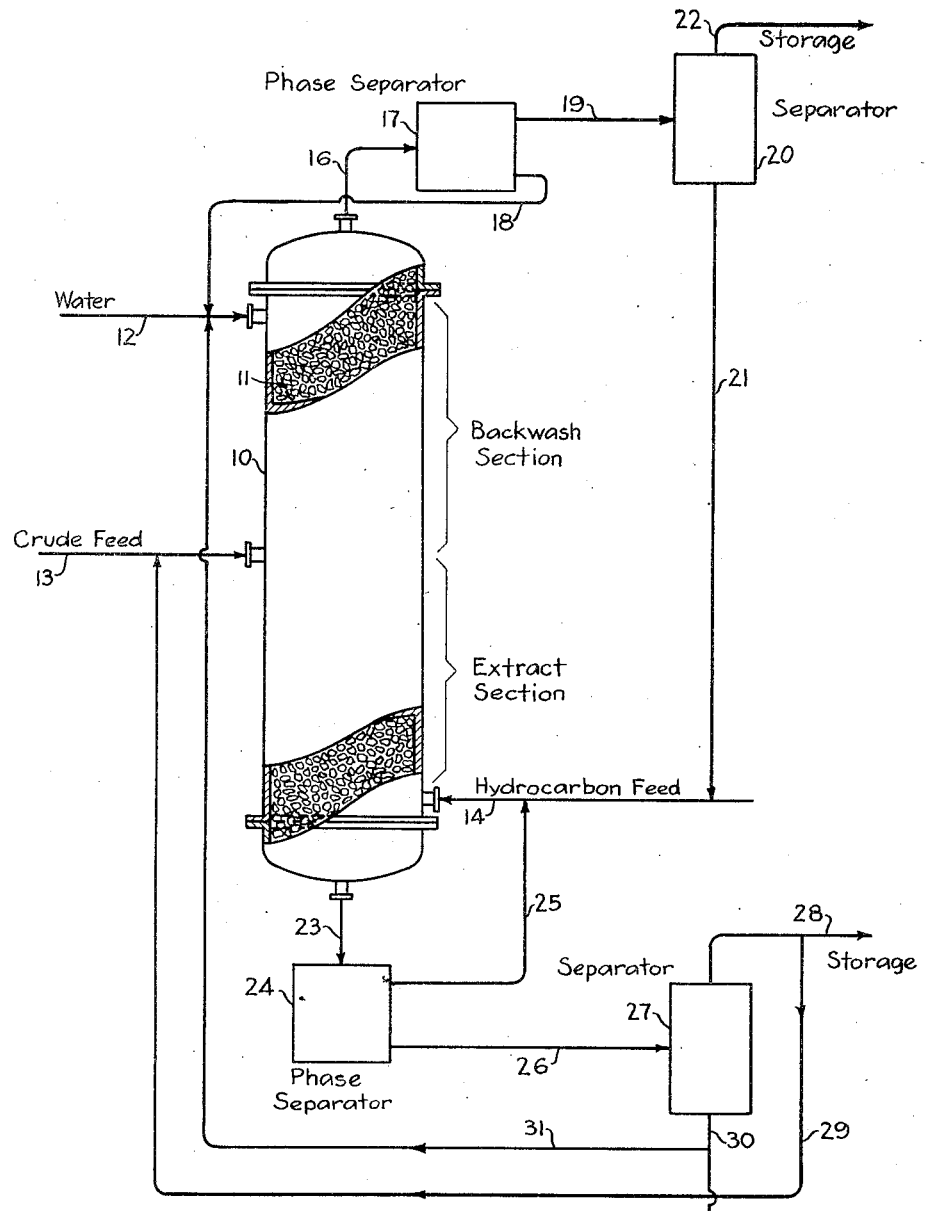

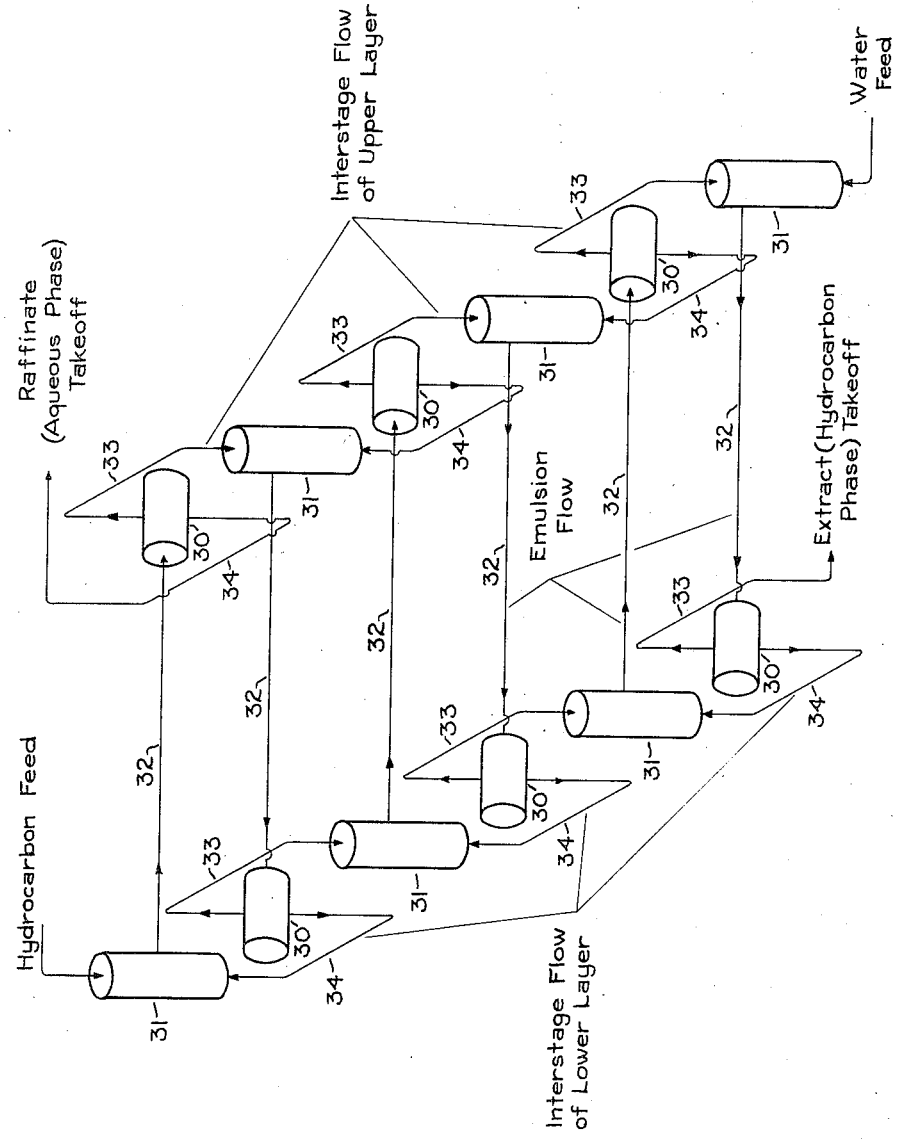
Fig. II

Patented Oct. 24, 1950

2,527,017

UNITED STATES PATENT OFFICE 2,527,017

PURIFICATION OF SECONDARY LOWER ALKYL AMINES

Daniel B. Luten, Jr., and Aldo De Benedictis, Berkeley, Calif., assignors to Shell Development Company, San Francisco, Calif., a corporation of Delaware Application January 28, 1947, Serial No. 724,818

6 Claims. (Cl. 260—583)

This invention relates generally to the separation and recovery of one or more components of a multi-component liquid system, and more particularly to a process for separating at least one component from a liquid system by an extraction process in which a selective solvent is employed to separate the desired component, the extract being subjected to a washing operation by a second solvent to remove dissolved or entrained impurities therefrom. The invention is especially directed to the separation of secondary amines from crude mixtures thereof with the by-products of their manufacture.

Accordingly, it is an object of the invention to provide a process for separating one or more components from a liquid mixture containing them. It is another object to provide an extraction process by which a desired component of a liquid mixture may be separated therefrom efficiently and in high purity. An additional object is to provide an extraction process in which the extract is washed with a second solvent to minimize the amount of impurities in the extract. A particular object is to provide an extraction process for separating secondary amines economically and in high purity from crude reaction mixtures containing them. Other objects and advantages of the invention, together with the manner in which they may be achieved, will become apparent from the following specification and drawings, in which:

Figure I is a schematic representation of a continuous countercurrent extraction apparatus wherein the extraction and washing steps are carried out simultaneously in the same unit; and Figure II is a schematic representation of a continuous discrete stage countercurrent extraction apparatus.

In the preparation of organic compounds the desired product is often left in a reaction mixture from which it is sometimes difficult to separate it in high purity. Often the simpler separation methods, such as distillation and decantation, may not be conveniently or economically employed, or may be totally inadequate. A typical example of a reaction mixture which is only difficultly separable into its components is that which results from the preparation of diisopropylamine by the vapor phase reaction of isopropyl alcohol and ammonia. This reaction mixture is illustrative of the systems to which the extraction process of the invention is directed, and will be used as an example herein to show the difficulties attendant upon ordinary separation methods and the manner in which the present invention overcomes these difficulties.

In the reaction between isopropyl alcohol and ammonia the crude product generally contains, in addition to the desired diisopropylamine, varying quantities of isopropylamine, unreacted ammonia and isopropyl alcohol, as well as acetone, water and traces of other by-products, such as methyl isobutyl carbinol and methyl isobutyl ketone. Separation of diisopropylamine from this mixture by fractional distillation is complicated by the fact that diisopropylamine forms minimum boiling azeotropes with both water (B. P. 74.4° C., about 10% by weight of water) and isopropyl alcohol (B. P. 79.7° C., 39% by weight of isopropyl alcohol). In addition, acetone and isopropylamine react readily to form an unstable condensation product, N-isopropyl acetone imine, whose properties are such that both acetone and isopropylamine appear in the distillate even at temperatures well above their normal boiling points, and therefore it is impossible to separate them from higher boiling components by distillation techniques.

In an attempt to effect the separation of diisopropylamine from a typical crude product resulting from this reaction, a column 30 feet tall by 8 inches inside diameter, packed with 1-inch carbon rings, was used for the fractionation. This column was estimated to be equivalent to at least 10 theoretical plates. The crude amine mixture charged into the column was a heart-cut (boiling range, 72° C.–78° C.) from a preliminary distillation, and contained about 75% diisopropylamine, 10% each of water and isopropyl alcohol, 3% to 5% of isopropylamine, and a trace of acetone. Despite the fact that a 10:1 reflux ratio was employed throughout the distillation, very poor separation of primary and secondary amines was experienced. Not only did the 72° C.–78° C. heart-cut contain isopropylamine (B. P. 32° C.) but the start cut, up to 65° C., contained 25% of the total diisopropylamine present in the original crude. Substantially no separation of isopropyl alcohol or water from diisopropyl amine was obtained.

In order to compare the degree of separation with column efficiency, a number of batch distillations of crude diisopropylamine were made in laboratory distillation columns equivalent to 15 and 20 theoretical plates, at 10:1 reflux ratios. It was found that the separation was not improved by the more efficient columns.

In accordance with the process of the present invention, recovery of diisopropylamine from a crude mixture such as that described above is accomplished by extraction of the secondary amine from such crude mixture with a hydrocarbon solvent from which it can be separated, preferably by distillation, while the undesirable dissolved or entrained materials are substantially removed from the hydrocarbon extract by washing with water. Specifically, then, the invention as applied to the recovery of diisopropylamine, involves a liquid-liquid extraction of the amine from an aqueous solution of the reactor product using a selective hydrocarbon solvent for the amine to effect the separation. We preferably use a continuous process in which the hydrocarbon solvent is forced to run countercurrently to a water back-wash stream in an extraction column. In the preferred technique the crude feed is conducted into the extraction column intermediate between the intake ports of the hydrocarbon and water streams. Wide latitude in the choice of extraction apparatus is, of course, possible, any conventional batch or continuous extractors being adaptable to the process.

Two flow plans which we have found to be satisfactory for our process are those depicted in Figures I and II. In Figure I there is shown schematically an extractor 10 packed with any suitable material 11, such as broken stone, glass rings, porcelain saddles, etc., and connected by lines 12, 13 and 14 to a water source, a crude feed source and a solvent (hydrocarbon feed) source, respectively. An overhead line 16 from the extractor conducts the extract to a phase separator 17, where the aqueous phase is separated from the extract and returned to the extraction column by means of line 18, while the extract passes by means of line 19 to a separator 20, such as a still, where the extracted component is separated from the solvent. The solvent may be recycled to the extractor through line 21 as shown, and the extracted component conducted to storage from the separator by a line 22. The raffinate flows downwardly in the extractor and is conducted by a line 23 from the extractor to a phase separator 24, where the solvent phase is separated from the aqueous phase and returned to the extraction column by means of line 25, while the raffinate passes by means of line 26 to a separator 27, such as a still, where the desired raffinate components are separated from the aqueous phase and from which they are conducted to storage through a line 28, or recycled in part to the extractor by a line 29; the stripped raffinate is conducted by a line 30 to discard or to be recycled in part to the extractor through a line 31.

In the apparatus described above, the extraction and backwash steps are conveniently carried out in the single column, the several components being intimately mixed by passing countercurrently through the packing in known manner. However, these steps may be performed in separate vessels and, for a description of a process involving such a procedure, reference is now made to Figure II where a flow diagram of a discrete stage extractor is presented. In that figure a series of phase separators 30 are arranged in two rows alternately with a series of mixers 31 provided with any convenient mixing means (not shown). The arrangement is such that each phase separator (except those at the ends of their respective rows) is between two mixers in its own row and opposite a mixer in the other row. The several mixers and phase separators are so connected that any particular phase separator receives its emulsion from the mixer opposite by means of a line 32 and delivers the extract to an adjacent mixer in one direction through a line 33 and the raffinate to a mixer in the other direction through a line 34. The arrangement may be further provided with means (not shown) for excluding any phase separator or mixer from the flow, thus making it possible to control the relative number of extraction and backwash steps (stages) employed. The apparatus may also include facilities (not shown) for the introduction of crude diisopropylamine into any desired mixer. The direction of material flow in Figure II, as indicated by the arrows, is such that the hydrocarbon phase runs countercurrently to the aqueous phase.

Following are descriptions of a representative number of extractions conducted according to our invention and exemplified by the separation of diisopropylamine from the crude product resulting from the reaction of isopropyl alcohol and ammonia.

*Example I*

A crude amine feed having approximately the following analysis:

| | Per cent by weight |
|---|---|
| Diisopropylamine | 7.7 |
| Isopropylamine | 3.5 |
| Isopropyl alcohol | 8.5 |
| Acetone | 1.6 |
| Water | 78.7 | was introduced at the top of an extraction column (equivalent to about five theoretical stages) at a rate of 41 cc. per minute, and n-pentane was introduced at the bottom of the column at a rate of 20 cc. per minute. The pentane extract recovered was then washed by a countercurrent stream of water in the same apparatus, the pentane extract being introduced at the bottom of the column at the rate of 39 cc. per minute, and the water at the top at 10 cc. per minute. The extraction and backwash steps were both conducted at normal room temperature. The pentane was distilled off and the residue, consisting of diisopropylamine of the following analysis on a solvent-free basis, was recovered:

| | Per cent by weight |
|---|---|
| Diisopropylamine | 98.5 |
| Isopropylamine | 0.45 |
| Isopropyl alcohol | 0.45 |
| Acetone | 0.15 |
| Water | 0.45 |

95.4% of the initial diisopropylamine was recovered. However, if desirable, the water wash could be extracted in a subsequent operation, whereby a total of 99.8% of the initial diisopropylamine could be recovered.

*Example II*

Using the apparatus arrangement of Figure I, a crude amine feed having approximately the following analysis:

| | Per cent by weight |
|---|---|
| Diisopropylamine | 21.9 |
| Isopropylamine | 11.5 |
| Ammonia | 2.9 |
| Isopropyl alcohol | 44.5 |
| Acetone | 6.7 |
| Water | 12.5 | was admitted to the extractor 10 through line 13. Simultaneously, water was introduced through line 12 at the top of the extractor while a hydrocarbon solvent entered the bottom through line 14. The flow rate in cubic centimeters per minute of the several streams through the extractor was maintained at about 26, 44 and 26, respectively, for crude feed, water and solvent. The temperature at which the extraction was conducted was maintained at about 40° C. The solvent employed was a paraffinic hydrocarbon cut having a boiling range of from about 150° C. to about 200° C. The extract, drawn from the top of the extractor through line 19, had the following analysis:

| | Per cent by weight |
|---|---|
| Diisopropylamine | 20.1 |
| Isopropylamine | 0.75 |
| Isopropyl alcohol | 2.77 |
| Acetone | 0.62 |
| Water | .24 |
| Solvent (by difference) | 75.52 |

The raffinate was simultaneously removed from the bottom of the extractor through line 26 and had the following analysis:

| | Per cent by weight |
|---|---|
| Diisopropylamine | 1.37 |
| Isopropylamine | 4.33 |
| Acetone | 2.69 |
| Ammonia | 1.05 |
| Water (by difference) | 90.56 |

The distance between the crude feed inlet and the water inlet (backwash section) was one-half the distance between the crude feed inlet and the solvent inlet (extraction section), i. e., the extraction section was twice as long as the backwash section. Under the conditions of this trial run the aqueous phase was dispersed in the hydrocarbon phase.

The analyses above show a recovery in the washed extract of 81.8% of the diisopropylamine in the crude, and a purity of the recovered diisopropylamine of 82.9% on an anhydrous solvent-free basis.

*Example III*

Using the same procedure described in Example II, another run was made in which the crude amine feed had approximately the following analysis:

| | Per cent by weight |
|---|---|
| Diisopropylamine | 22.0 |
| Isopropylamine | 10.4 |
| Ammonia | 1.40 |
| Isopropyl alcohol | 43.5 |
| Acetone | 6.1 |
| Water | 15.0 |

In this run the length of the backwash section was equal to that of the extraction section. Crude amine was introduced into the extractor at the rate of 19 cc. per minute, hydrocarbon solvent at 19 cc. per minute, and water at 34 cc. per minute. The hydrocarbon phase was dispersed in the aqueous phase.

Analysis of the extract was:

| | Per cent by weight |
|---|---|
| Diisopropylamine | 13.15 |
| Isopropylamine | 0.09 |
| Isopropyl alcohol | 0.33 |
| Acetone | 0.08 |
| Water | 0.17 |
| Solvent (by difference) | 86.18 |

Analysis of the raffinate was:

| | Per cent by weight |
|---|---|
| Diisopropylamine | 0.32 |
| Isopropylamine | 2.64 |
| Acetone | 1.81 |
| Ammonia | 0.36 |
| Water (by difference) | 94.87 |

Recovery of diisopropylamine was 94.7%; its purity was 96.3% on an anhydrous, solvent-free basis.

Using the arrangement of Figure II, a number of experiments were conducted to determine the effects of the several variables on the amount and purity of diisopropylamine recovered. These experiments are set out in Examples IV to XIV below.

*Example IV*

A crude amine having the same composition as that used in Example II was treated in the apparatus depicted in Figure II under the following conditions:

| | |
|---|---|
| Water to solvent volume ratio | 0.80 |
| Solvent to crude amine volume ratio | 1.31 |
| Extraction stages | 4 |
| Backwash stages | 2 |
| Temperature | 40° C. |

Recovery of diisopropylamine was 94.4% by weight; purity was 92.7%.

*Example V*

Example IV was repeated except that the water to solvent volume ratio and the solvent to crude amine volume ratio were maintained at approximately 1.04 and 1.25, respectively. Recovery of diisopropylamine was 95.1% by weight; purity of the recovered product was 95.3%.

*Example VI*

Example IV was repeated except that the water to solvent volume ratio and the solvent to crude amine volume ratio were maintained at approximately 1.74 and 2.4, respectively. Recovery of diisopropylamine was 97.6% by weight; purity was 98.8%.

*Examples VII and VIII*

Two additional runs were made substantially as in Example IV, except the temperatures maintained were about 30° C. and about 50° C., respectively. At 30° C., 91.1% by weight of the diisopropylamine was recovered, and its purity was 94.4%. At 50° C., 95.2% by weight of diisopropylamine was recovered, and its purity was 89.6%.

*Examples IX, X, XI, XII, XIII and XIV*

Six additional runs were made as follows, using the apparatus of Figure II. The crude diisopropylamine extracted had the same composition as that used in Example II.

| | Total Runs | | | | | |
|---|---|---|---|---|---|---|
| | 1 | 2 | 3 | 4 | 5 | 6 |
| Total stages | 4 | 5 | 6 | 3 | 5 | 6 |
| Water backwash stages | 2 | 2 | 2 | 1 | 1 | 1 |
| Temperature, °C | 40 | 40 | 40 | 40 | 40 | 40 |
| Solvent to crude amine volume ratio | 1.01 | 0.97 | 0.95 | 1.01 | 0.97 | 0.95 |
| Water to solvent volume ratio | 1.86 | 1.79 | 1.61 | 1.83 | 1.88 | 1.84 |
| Diisopropylamine recovery, percent wt | 84.2 | 90.9 | 94.1 | 84.4 | 93.7 | 96.6 |
| Diisopropylamine purity, percent | 97.9 | 97.8 | 97.7 | 95.9 | 95.3 | 91.5 |

The terms "extraction stage" and "backwash stage," as used herein, e. g. in Examples IV through XIV, wherein apparatus according to Figure II, or modifications thereof, was employed, refer to the number of discrete unit operations of mixing between the points at which the crude feed and solvent, and the crude feed and backwash, respectively, were introduced. The "total stages" is the sum of the number of extraction and backwash stages. In Examples II and III, wherein apparatus according to Figure I was employed, extraction and backwash were performed simultaneously in a single column which is conveniently divided into sections designated as "extract section" and "backwash section," which terms define those sections between the solvent and crude feed inlets and between the backwash and crude feed inlets, respectively. By proper choice of dimensions of the backwash and extract sections of a single column extractor, the results obtained with any combination of discrete extraction and backwash stages may be substantially duplicated. Therefore, references herein to extraction or backwash "stages" are applicable to a single column extractor as well as discrete stage apparatus, unless otherwise stated.

From the above and other experiments with our extraction process we have found that it is possible, by selecting the proper values of the several variables, to effect the recovery of secondary amines and other organic compounds, from mixtures containing them, in almost any yield of purity. For example, we have discovered that at a constant water to hydrocarbon solvent volume ratio the recovery and purity of the extracted component decrease as the concentration of such component in the extract increases. This ratio may be varied over a wide range, say between about 0.5 and about 10.0, with satisfactory results, depending upon whether proportion of the extracted component recovered or its purity is of predominant importance. In the case of diisopropylamine extraction we prefer to use water to solvent volume ratios between about 0.75 and about 2.0 for we have determined that for a given concentration of diisopropylamine in the extract phase it is possible in that range to effect a good balance between total recovery and purity of diisopropylamine.

The recovery of the extracted component is principally determined by the number of extraction stages employed, assuming sufficient solvent is provided to extract substantially all of the desired component. However, the purity of the component is a function of the number of backwash stages used. The number of backwash stages does not significantly alter the recovery of extracted component with any given number of extraction stages. Although the process may obviously be carried out to some advantage over a wide range of washing conditions, we prefer to use at least one backwash stage for every five extraction stages, and, since we are especially concerned with purity of final product, we particularly prefer to use at least one backwash stage for every two extraction stages.

The amount of solvent used according to our invention may conveniently vary over a wide range. In general, the minimum amount of solvent employed will be that volume necessary to extract any given proportion of the desired component, such as diisopropylamine, from a given volume of the crude mixture, when the solvent is employed to extract the crude mixture countercurrently through an infinite number of stages. From our investigation of many systems extracted according to our process, we have discovered that there is a certain relationship between volume of solvent and the combined volume of crude feed and backwash which must be maintained in order to obtain complete extraction. Specifically, in the case of diisopropylamine recovery, the minimum volume of solvent employed to insure complete extraction, when a preferred solvent, as hereinafter described, is employed, is between about 10% and about 50% of the combined volume of crude feed and backwash, depending upon the concentration of diisopropylamine in the feed. When the ratio of crude feed to backwash is low, of the order of about 1:20, the minimum volume of solvent for complete extraction approaches 10% of the combined volume of crude feed and backwash. Where such ratio is high, of the order of about 1:2, the minimum volume of solvent approaches 50% of the combined volume of crude feed and backwash. It is advisable, however, to use more than the minimum required volume of solvent, and we have obtained excellent results using between about 3 and about 30 volumes of solvent per volume of desired component in the crude feed. Greater or smaller volumes may be used if desired. When extracting a crude diisopropylamine mixture, we preferably use between about 5 and about 7 volumes of solvent to 1 volume of diisopropylamine since that ratio has been found to permit recoveries of diisopropylamine of over 95% and of a purity of over 94%, using four extraction stages and two backwash stages.

The temperature at which our extraction process is conducted significantly affects both the recovery and purity of the extracted component. Within the range of about 30° C. to about 50° C., we have found that an increase in operating temperature results in a corresponding increase in the recovery of the component but is likewise attended by a decrease in its purity. Selection of the operating temperature, therefore, will depend upon the relative importance of recovery and purity of product. We prefer to operate our extractions within the range of about 30° C. to about 50° C., and, particularly, at about 40° C., since at this temperature it is possible to obtain a very good yield of satisfactory purity for most purposes. Higher or lower temperatures may be used if desired; for example, temperatures as low as 0° C., or as high as 100° C., may be satisfactory under certain conditions, as when the volatility of a particular solvent makes it advisable to operate at the lower temperatures. The effect of temperature on yield and purity of extracted component is brought out in Examples IV, VII and VIII for diisopropylamine.

We have further discovered that the extraction efficiency of our process is of the same order of magnitude with the hydrocarbon solvent phase dispersed in the aqueous phase as it is with the aqueous phase dispersed in the hydrocarbon phase. However, in a single extraction column (Figure I) the height equivalent to a theoretical stage in the backwash section is reduced considerably by operating with the hydrocarbon phase dispersed. We therefore prefer to conduct our extractions with the hydrocarbon phase dispersed.

An additional discovery growing out of our experiments is that better efficiency is obtained in the backwash section if the extraction and backwash operations are performed in separate extraction units than when these operations are carried out simultaneously in different sections of the same unit, even at what appear to be equivalent backwash conditions.

As hereinbefore stated, the process of our invention is preferably conducted in a continuous manner, but is adaptable to batch or intermittent operation where desirable or more convenient. For example, a crude amine-containing feed may be mixed with a solvent which selectively dissolves the amine, the solvent containing the amine dissolved therein recovered and washed by mixing with a solvent immiscible therewith and capable of dissolving other components of the crude feed. The two immiscible solvents, each containing an increased proportion of the component or components which it selectively extracts, are separated and the amine separated from its solvent as, for example, by distillation.

The solvents which may be used satisfactorily in our process include the paraffinic hydrocarbons or mixtures of paraffinic hydrocarbons, having boiling points or principal boiling ranges which fall between about 0° C. and about 250° C. at standard conditions of temperature and pressure. Among these are the isomers of butane, pentane, heptane, octane, nonane, decane, hendecane, dodecane, tridecane, and tetradecane and mixtures thereof. Minor quantities of higher or lower boiling paraffinic hydrocarbons may be present. We prefer to use a solvent whose boiling point is sufficiently different from the boiling point of the extracted component so that they may be conveniently separated by distillation, and preferably the boiling point of the solvent is also substantially different from the boiling points of any by-products which may be present in substantial quantities. Other solvents useful in our process may, however, have boiling points or boiling ranges below 0° C. or above 250° C. Where solvents are used which normally boil below the preferred temperatures of the extraction and backwash steps, the process may be carried out at increased pressures. Solvents in our preferred range are easily obtained and require no special handling. An advantage in using a low-boiling hydrocarbon as the solvent in extracting diisopropylamine is that it may later be employed to remove both water and isopropyl alcohol which contaminate the diisopropylamine to a small degree. Normal pentane, for example, forms a ternary azeotrope with water and isopropyl alcohol, the three components being present in the weight percentages 94.9, 1.9 and 3.2, respectively. The extraction solvent should, of course, be separable from the extracted components, preferably by distillation. We therefore conveniently select as our solvent one whose boiling point or boiling range is sufficiently different from that of the extracted components to facilitate their separation by distillation, as above described.

In describing our invention with specific reference to the recovery of diisopropylamine, we have mentioned only water as the backwash liquid. It is to be understood, of course, that other liquids and combinations of liquids may also be so employed. Examples of these will be given hereinafter, but it may now be stated as a generality that to qualify as a satisfactory backwash liquid for our process such liquid need only be substantially immiscible with and separable from the extraction solvent, and preferentially dissolve the raffinate components.

Separation of the extracted component from the solvent, and, if desired, from the small percentage of impurities dissolved in the extract, may be effected in any known manner. For example, in a typical diisopropylamine extraction, according to our invention, the extract, containing a small percentage of water (about 1.2%–1.4% by weight of diisopropylamine) and isopropyl alcohol, may be treated as follows. The extract may first be passed over a dehydrating agent, such as anhydrous calcium sulfate or activated alumina, to remove the water, after which the diisopropylamine may be separated from the hydrocarbon by fractional distillation. Alternatively, the extract may be distilled at the outset, the water-diisopropylamine azeotrope (containing 10% water) distilling off first at about 74.4° C., followed by the isopropyl alcohol-diisopropylamine azeotrope containing 39% isopropyl alcohol boiling at 79.7° C., and anhydrous diisopropylamine would then follow at 83.8° C. Where separation of diisopropylamine is effected by distillation directly from the original extract, the azeotrope may be recycled to the extractor. Azeotropic removal of water and isopropyl alcohol by addition of n-pentane, as above mentioned, may be used as an additional step in the removal of diisopropylamine from the extract thereof in a higher boiling solvent.

While the foregoing discussion has been largely restricted to the recovery of diisopropylamine, it is to be understood that the present process is applicable to the recovery of a wide variety of other organic substances. For example, by proper choice of solvent, backwash liquid, and operating conditions, primary, secondary, and tertiary amines generally may be recovered from liquid mixtures corresponding to those herein described. Thus, by our process, tri-sec-butylamine, di-sec-butylamine or sec-butylamine may be recovered as the desired product in any desired yield and purity from a crude reactor product containing tri-sec-butylamine, di-sec-butylamine, sec-butylamine, ammonia, methyl ethyl ketone, sec-butyl alcohol and water. And so, also, may diethylamine, di-n-propylamine, di-n-butylamine, ethylamine, n-propylamine, n-butylamine, triethylamine, tri-n-propylamine, tri-n-butylamine, bis-1,3-dimethylbutylamine, etc. be recovered from mixtures containing the primary, secondary, and tertiary amines, alcohols, ammonia, and other impurities. Another type of system to which our invention may be applied is a system resulting from the manufacture of ethers, containing the ethers in solution with the corresponding alcohols, sulfuric acid and other reactor products. The backwash liquid in the ether-alcohol systems, however, is preferably a mixture of water and an alcohol, such as ethyl alcohol or ethylene glycol. The alcohol in these backwash liquids actually strips the impurities from the hydrocarbon extract, while the principal function of the water is to prevent the alcohol from dissolving in the hydrocarbon to any appreciable extent. A composite backwash liquid, such as a water-alcohol solution, will therefore contain a major proportion of the active solvent member and a minor proportion of water. A satisfactory composition for the water-alcohol solution, when used as the backwash in the extraction of ethers, is about 5% to 35% of water and about 95% to 65% of alcohol, by volume. Greater or smaller proportions of water in alcohol may be used if desired. We prefer to use water-alcohol mixtures containing between about 5% and about 30% of water, by volume.

We claim as our invention:

1. The method of separating a secondary lower alkyl amine from crude secondary aliphatic amine containing said secondary lower alkyl amine in admixture with impurities comprising a primary aliphatic amine, which comprises introducing into an extraction zone a normally liquid paraffinic hydrocarbon solvent, separately introducing into said extraction zone a backwash at a point remote from the point of introduction of said solvent, said backwash being immiscible with said secondary amine and miscible with said impurities comprising said primary amine, introducing said crude secondary amine into said extraction zone at a point intermediate the points of introduction of said solvent and said backwash, thereby forming an extract phase consisting essentially of said secondary amine and said solvent and a raffinate phase consisting essentially of said primary amine-containing impurities in admixture with said backwash in said extraction zone, separately withdrawing said extract and raffinate phases from said extraction zone, and separating said secondary amine from said extract phase.

2. The method of separating diisopropylamine in a relatively high state of purity from crude diisopropylamine containing said diisopropylamine in admixture with aqueous isopropylamine and isopropyl alcohol, which comprises introducing a normally liquid paraffinic hydrocarbon solvent into said extraction zone, separately introducing a stream of backwash into said extraction zone at a point remote from the point of introduction of said solvent, introducing said crude diisopropylamine into said extraction zone at a point intermediate the points of introduction of said solvent and said backwash, thereby forming an extract phase consisting essentially of diisopropylamine and solvent and a raffinate phase consisting essentially of isopropylamine, isopropyl alcohol and water in said extraction zone, separately withdrawing said extract and raffinate phases from said extraction zone, separating water from said raffinate phase, introducing said water separated from the raffinate phase as said backwash into said extraction zone, and separating diisopropylamine from said extract phase.

3. The method of separating diisopropylamine in a relatively high state of purity from crude diisopropylamine containing said diisopropylamine in admixture with aqueous isopropylamine and isopropyl alcohol, which comprises introducing pentane into an extraction zone, introducing a stream of backwash into said extraction zone at a point remote from the point of introduction of said pentane, introducing said crude diisopropylamine into said extraction zone at a point intermediate the points of introduction of said pentane and said backwash, thereby forming an extract phase consisting essentially of pentane and diisopropylamine and a raffinate phase consisting essentially of isopropylamine, isopropyl alcohol and water in said extraction zone, separately withdrawing said extract and raffinate phases from said extraction zone, separating water from said raffinate phase, introducing said water separated from said raffinate phase as said backwash into said extraction zone, and separating diisopropylamine from said extract phase.

4. The method of separating diisopropylamine in a relatively high state of purity from crude diisopropylamine containing said diisopropylamine in admixture with isopropylamine and isopropyl alcohol, which comprises introducing a normally liquid paraffinic hydrocarbon solvent into an extraction zone, introducing water into said extraction zone at a point remote from the point of introduction of said hydrocarbon solvent, introducing said crude diisopropylamine into said extraction zone at a point intermediate the points of introduction of said hydrocarbon solvent and water, thereby forming an extract phase consisting essentially of hydrocarbon solvent and diisopropylamine and a raffinate phase consisting essentially of isopropylamine, isopropyl alcohol and water in said extraction zone, separately withdrawing said extract and raffinate phases from said extraction zone, and separating diisopropylamine from said extract phase.

5. The method of separating diisopropylamine in a relatively high state of purity from crude diisopropylamine containing said diisopropylamine in admixture with isopropylamine and isopropyl alcohol which comprises, introducing pentane into an extraction zone, introducing water into said extraction zone at a point remote from the point of introduction of said pentane, introducing said crude diisopropylamine into said extraction zone at a point intermediate the points of introduction of said pentane and said water, thereby forming an extract phase consisting essentially of pentane and diisopropylamine and a raffinate phase consisting essentially of isopropylamine, isopropyl alcohol and water in said extraction zone, separately withdrawing said extract and raffinate phases from said extraction zone, and separating diisopropylamine from said extract phase.

6. The method of separating di-sec-butylamine in a relatively high state of purity from crude di-sec-butylamine containing said di-sec-butylamine in admixture with aqueous sec-butylamine and sec-butyl alcohol, which comprises introducing a normally liquid paraffinic hydrocarbon solvent into an extraction zone, separately introducing a stream of backwash into said extraction zone at a point remote from the introduction of said solvent, introducing said crude di-sec-butylamine into said extraction zone at a point intermediate the points of introduction of said solvent and said backwash, thereby forming an extract phase consisting essentially of di-sec-butylamine and solvent and a raffinate phase consisting essentially of sec-butylamine, sec-butyl alcohol and water in said extraction zone, separately removing said raffinate and extract phases from said extraction zone, separating water from said raffinate phase, passing water separated from said raffinate phase to said extraction zone to be used as said backwash therein, and separating di-sec-butylamine from said extract phase.

DANIEL B. LUTEN, Jr.
ALDO DE BENEDICTIS.

REFERENCES CITED

The following references are of record in the file of this patent:

UNITED STATES PATENTS

| Number | Name | Date |
| --- | --- | --- |
| 2,081,721 | Van Dijck | May 25, 1937 |
| 2,125,905 | Fenske | Aug. 9, 1938 |
| 2,362,579 | Murray et al. | Nov. 14, 1944 |

OTHER REFERENCES

Sherwood, "Absorption and Extraction" (McGraw Hill Book Co., first edition, 1937) pages 237–240.